Feb. 3, 1931.          C. C. BUCKELS          1,791,117
OUTLET BOX AND MEANS FOR SUPPORTING THE SAME
Filed April 6, 1928
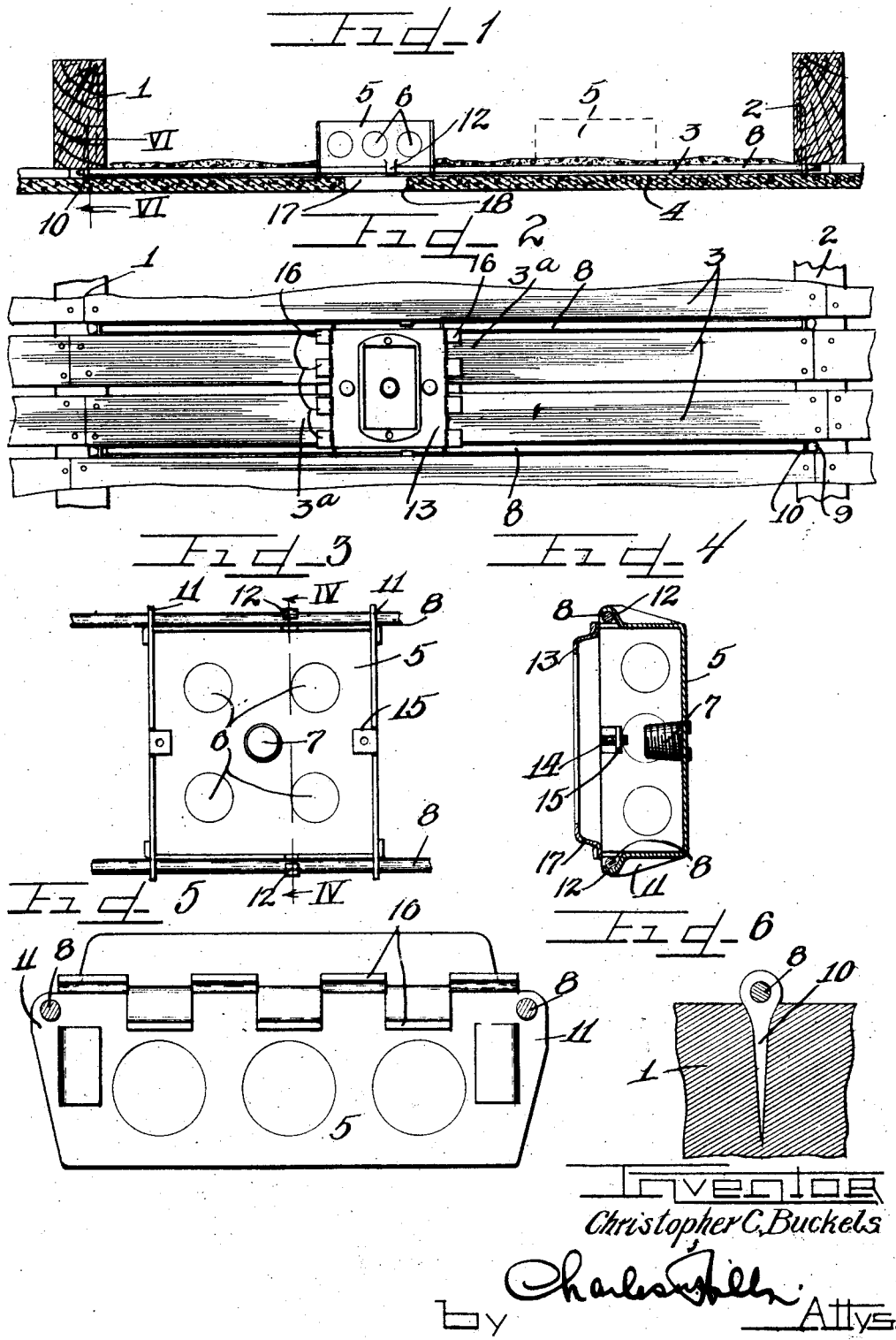
Inventor
Christopher C. Buckels
by Charles... Attys.

Patented Feb. 3, 1931

1,791,117

UNITED STATES PATENT OFFICE

CHRISTOPHER C. BUCKELS, OF CHICAGO, ILLINOIS, ASSIGNOR TO TRI-PLEX ELECTRICAL MANUFACTURING COMPANY, OF CHICAGO, ILLINOIS, A CORPORATION OF ILLINOIS

OUTLET BOX AND MEANS FOR SUPPORTING THE SAME

Application filed April 6, 1928. Serial No. 267,836.

This invention relates to improvements in outlet boxes, switch boxes and the like, and means for supporting the same, and more particularly to means for adjustably supporting the outlet box in any desired location in a wall, floor, ceiling, or other frame work in a building or equivalent structure.

It is common practice to mount outlet boxes, switch boxes, and the like, in their desired locations in walls, ceilings, and similar portions of a building, prior to the completion of these portions. In the past, means employed for supporting outlet boxes and the like, in any desired position in a wall, for example, have in most instances proven extremely objectionable in that they did not positively and securely retain the box in its correct position during the completion of the wall. In most instances, the box would be slightly out of line when tiling or plastering was applied to the wall, and when the box was restraightened and wired, the tiling or plaster was injured, thereby necessitating recalling of the tilers and plasterers to patch the wall adjacent the box. In many instances, continual repatching of this sort, permanently detracted from the appearance of the wall. Moreover, with these formerly known devices where it was necessary to cut the lathing to make room for the box, loosely projecting and unsupported ends of laths were left adjacent the box, thereby providing a materially weak spot in the wall. It has been found, therefore, highly desirable to provide mounting means for outlet boxes and the like, which totally eliminate the human equation when employed or used.

In view of the above noted as well as other defects and objections, it is accordingly an object of the present invention to provide means adapted to adequately and positively support an outlet box in its desired location in the wall during the completion of the wall and at all times thereafter.

It is also an object of the present invention to provide means for adjustably supporting an outlet box, which means occupy only what would otherwise be waste space and afford no projecting parts on either side of the wall on which they are mounted.

A further important object of the present invention is to provide means for properly supporting an outlet box in any desired location between studs, joists, or the like, in the frame of a building, so that the outlet box may adequately support loosely projecting lath ends adjacent thereto and thereby leave the frame solid and rigid in all parts.

A still further object of the present invention is to provide means for supporting an outlet box in any desired location in a wall so that portions associated with the box will define the plaster line of the wall.

Other and further important objects of the present invention will be apparent from the disclosures in the specification and the accompanying drawings.

This invention (in a preferred form) is illustrated in the accompanying drawings and hereinafter more fully described.

On the drawings:

Figure 1 is a fragmentary plan sectional view through the wall of a building, showing an outlet box mounted therein by means embodying principles of the present invention.

Figure 2 is a fragmentary elevational view of the structure shown in Figure 1, prior to the application of plaster to the wall.

Figure 3 is a fragmentary front view of the outlet box and mounting means, the cover of the box being removed.

Figure 4 is a sectional view of the box taken substantially along the line IV—IV of Figure 3 with the cover applied.

Figure 5 is an enlarged end view of the box and cover.

Figure 6 is an enlarged fragmentary sectional view taken substantially along line VI—VI of Figure 1.

As shown in the drawings:

In the illustrated embodiment of this invention there is shown a portion of a building wall comprising studs or joists 1 and 2, laths 3 connecting the joists, and plaster 4 applied to the laths.

An outlet box 5 constructed in any desired manner and provided with the usual knockout plates 6 and with an attachment plug 7, mounted in the wall by means embodying principles of the present invention. The means, in this instance, comprises a pair of spaced rods 8, one of which is disposed on either side of the box, and which are secured to the studs 1 and 2 and extend between adjacent laths 3. The rods 8 are preferably provided with enlarged or flattened ends 9 thereon which serve to maintain apertured nails 10 upon the rods by which they are secured to the studs 1 and 2. With the nails originally provided upon the rods, exceedingly rapid mounting of the rods may be accomplished.

Opposite sides of the outlet box 5 are provided on each extremity thereof, with ears 11, preferably integral with the aforesaid sides, which are apertured to slidingly receive therethrough the rods 8. The rods, box, and securing pins or nails 10, are preferably assembled into a complete unit prior to the mounting thereof, the assembling being done at the place of manufacture or on the individual job, it being only necessary to flatten the rod ends as indicated at 9 to retain the rods against slipping. After the structure is mounted as hereinbefore described, the box is slid along the rods until its desired location is reached when it is fixedly secured to the rods 8 by the knocking or bending down of lugs 12, preferably integral with the other opposite sides of the box, so that the lugs will bite into the rods 8 or at least firmly grip the same and thereby prevent any further movement of the box.

Of course, to properly set the box in its desired position, it is necessary to cut out certain portions of the laths 3 to make room for the box, whereby projecting lath ends 3a are left on either side of the box. In the present instance, a cover 13 is attached to the box by means of screws 14 and lugs 15 or in any appropriate manner. The cover is provided on each side thereof with staggered tongues 16, each alternate tongue being bent upwardly and outwardly and those disposed therebetween being bent downwardly and outwardly, as more clearly set forth and described in my copending applications, cover for outlet boxes and method of using the same, filed April 6th, 1928, Serial No. 267,835; and adjustable outlet boxes, filed April 6th, 1928, Serial No. 267,837. These tongues positively and firmly engage the projecting lath ends 3a and adequately support the same, thereby eliminating any element of weakness in the wall as a whole.

The cover, as also described in my above identified copending application, is provided with an outwardly extending flange 17 adapted for the securement thereto of switch face plates or similar devices. When the rods 8, box 5, and cover 13, are mounted as hereinbefore described, the outer extremity of the flange 17 will positively and exactly define the plaster line of the wall, as indicated at 18 in Figure 1. After the mounting of the structure the plaster may then be applied in a free and easy manner, no movement of the box 5 being possible and no retouching or patching being necessary after the plaster is once applied.

It is to be noted that the mounting means herein described are spaced between adjacent laths and do not project on either side thereof, occupying only space that normally would be wasted. Although the device has been shown and described as mounted in a wall of a building, it is to be clearly understood that the outlet box may be mounted in similar fashion in ceilings, floors, or any desired part of a building.

From the foregoing it is apparent that I have provided means for mounting an outlet box in any desired portion of a wall, the means being simple in construction and providing a material saving of time and labor in the use thereof. Moreover, with the employment of the means herein described, the box is initially adjustably supported, the lathing adequately supported regardless of where cut, and the plaster line clearly defined, whereby many costly measurements and gaugings are eliminated, as well as a goodly portion of the human equation since the structure itself when properly mounted determines its own location.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. In combination, a pair of similar rods, an outlet box movable along said rods, and means on said rods for mounting the same.

2. In combination, a rod mountable to a portion of a building frame between adjacent laths, means on said rod for mounting the same, an outlet box adjustably carried by said rod, and means integral with a portion of said box for fixedly securing the same to said rod.

3. In combination, an outlet box having apertures therein adjacent opposed sides thereof, supporting rods in spaced relationship and passing through said apertures to adjustably support said box, and means on opposed sides of said box for fixedly securing said box to said rods in any desired location therealong.

4. In combination, supporting members, an outlet box adjustably mounted thereon, a cover for said box, and lath engaging means on said cover for supporting free lath ends adjacent said box.

5. In combination, supporting members, an outlet box adjustably mounted on said supporting members, means for fixedly securing said box to said members in any desired location, a cover on said box, and means on each side of said cover for engaging lath extremities on each side of said box for supporting the laths.

6. In an outlet box, a box-like structure, apertured ears on opposing parts of said structure for adjustably engaging supporting means, and lugs on said structure intermediate said ears adapted to be bent to fixedly hold said structure to said means.

7. In combination, supporting means mountable between laths in a wall, an outlet box, a cover for said box, means on said box for engaging said supporting means, and means on said cover for supporting loosely projecting laths adjacent thereto.

In testimony whereof I have hereunto subscribed my name at Chicago, Cook County, Illinois.

CHRISTOPHER C. BUCKELS.